United States Patent [19]

Hirose

[11] Patent Number: 5,388,786
[45] Date of Patent: Feb. 14, 1995

[54] ESCAPE APPARATUS

[76] Inventor: Tokuzo Hirose, 13-13, Higashiyama-cho, Ashiya-shi, Hyogo, Japan

[21] Appl. No.: 208,652

[22] Filed: Mar. 9, 1994

[30] Foreign Application Priority Data

Dec. 29, 1993 [JP] Japan .................................. 5-349656

[51] Int. Cl.⁶ .............................................. B64D 17/72
[52] U.S. Cl. .................................. 244/138 R; 244/146; 244/147; 244/902; 182/3; 182/48
[58] Field of Search ............... 244/138 R, 145, 146, 244/147, 149, 142, 902; 182/3, 48

[56] References Cited

U.S. PATENT DOCUMENTS 3,412,963  11/1968  Struble, Jr. ............................ 244/146
4,105,173   8/1978  Bucker ................................. 244/147
4,257,598   3/1981  Bücker ................................. 244/149
4,776,538  10/1988  Ravnitzky ............................. 244/145
5,028,018   7/1991  Krebber ............................... 244/146

Primary Examiner—Galen L. Barefoot
Attorney, Agent, or Firm—Iandiorio & Teska

[57] ABSTRACT

An object of the invention is to provide an escape apparatus which enables persons to promptly escape from an elevated place such as a building and an aircraft, and is easy to handle. An aerial floating flier such as airfoil or a parachute is folded and contained in a case, and by throwing out such a case or an aerial floating flier in folded state into the air, the aerial floating flier is spread in the air, thereby allowing to escape from a site of an accident by hanging from the aerial floating flier and descend slowly on the ground.

5 Claims, 5 Drawing Sheets

Fig. 3 (1)
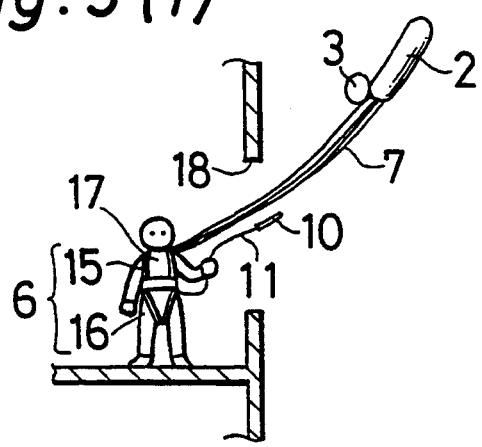
Fig. 3 (2)
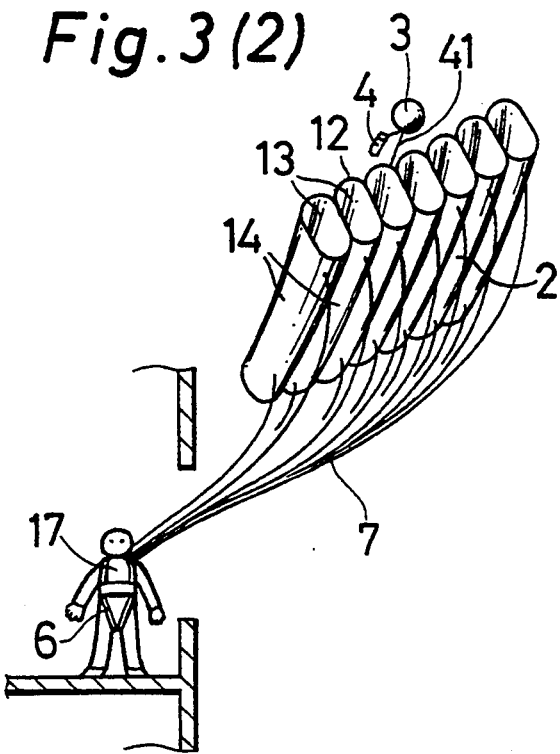
Fig. 3 (3)
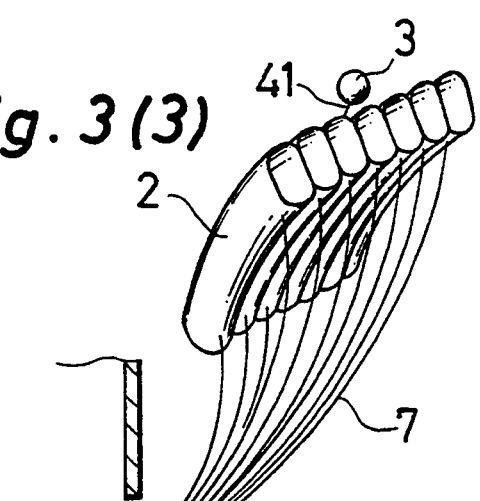
Fig. 3 (4)
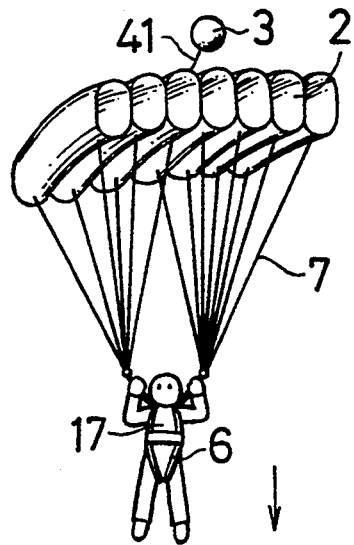

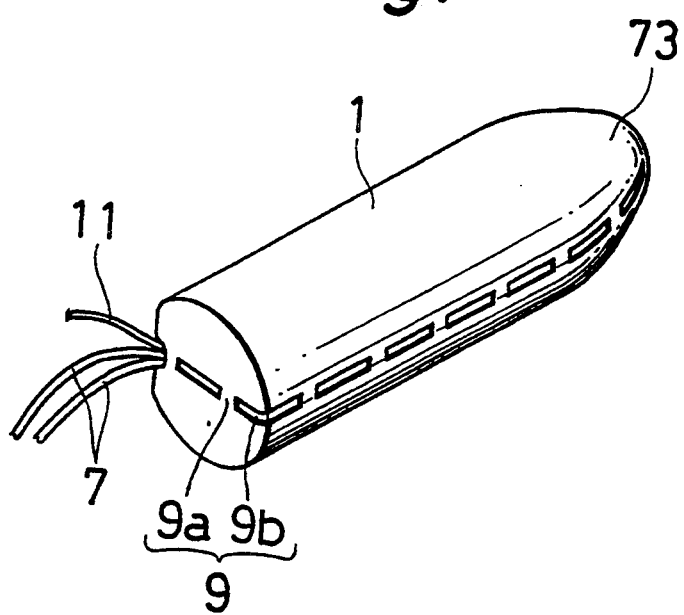

ESCAPE APPARATUS

BACKGROUND OF THE INVENTION

1. Field of the Invention

The present invention relates to a floating and flying type escape apparatus in the air effectively utilized for escaping and descending from the site of fire or the like in a building, etc.

2. Description of the Related Art

In the event of a fire in a building or the like, delay in escape from the site is a fatal problem. When an aircraft falls in trouble during flight, it is demanded to escape earlier than the crash.

Hitherto, when a fire or the like occurs in a building, people in the building take dangerous measures such as running downstairs to escape from the site. Further, in case of an accident of an aircraft crash, a large number of lives are lost. To descend slowly from an elevated place, a parachute has been conventionally used, but to handle is very difficult for general people inexperienced in handling it. Additionally, it is relatively large in size, which makes it more difficult to handle.

SUMMARY OF THE INVENTION

It is hence a primary object of the invention to provide a floating and flying type escape apparatus in the air which can be easily handled even by not trained general people for promptly escaping from an elevated place such as a building, an aircraft in flight or the like, in an accident.

The invention therefore presents an escape apparatus by floating and flying comprising an aerial floating flier such as an airfoil and a parachute being contained in a case, wherein one end of a flexible cord is connected to the aerial floating flier, other end of the flexible cord is connected to a harness to be worn on a human body, and the case or the aerial floating flier contained in the case is projected into the air by a person wearing the harness on his body or by projecting means, whereby the aerial floating flier is spread in the air so that the person can safely and slowly descend even from a relatively low altitude.

The invention also presents an escape apparatus by floating and flying comprising an aerial floating flier such as an airfoil and a parachute being contained in a case, wherein one end of a flexible cord is connected to the aerial floating flier, other end of the flexible cord is connected to a harness to be worn on a human body, a float body like a bag to float in the air is connected to the aerial floating flier, and the case or the aerial floating flier contained in the case is projected into the air by a person wearing the harness on his body or by projecting means, whereby firstly the aerial floating flier is lifted by the float body and secondly the aerial floating flier is spread in the air so that the person can safely and slowly descend even from a relatively low altitude.

The invention moreover presents an aerial floating and flying type escape apparatus comprising:
a case being made of a synthetic resin sheet, in which a portion perforated in sewing line form to be cut is circumferentially formed in an endless loop,
an airfoil being contained in the case, being constituted by plural laterally coupled bags having an opening provided in a front portion thereof at a time of floating and flying, being made of an flexible synthetic resin sheet, and being folded in such a manner to spread when popping out of the case,
an airtight float bag being folded and contained in the case, and being made of an flexible synthetic resin sheet,
a gas filled pressure vessel being contained in the case, for feeding gas with a specific gravity less than that of air into a float bag,
valve means being interposed between the float bag and pressure vessel, for opening the valve by pulling an operation piece,
a harness to be worn on a human body,
an flexible cord with one end connected to the sheet and other end connected to the harness, and
an operation cord shorter than the cord for coupling the operation piece of the valve means and the harness,
wherein the float bag is connected to the vicinity of the opening of the bag of the airfoil.

According to the invention, with a harness worn on a human body, a case of the escape apparatus or an aerial floating flier contained in the case is projected upwards into the air by a person wearing the harness on his body or by projecting means such as a pistol-type one, whereby the aerial floating flier is spread in the air. Thus, since even the general people not particularly trained can see and confirm that the aerial floating flier is spread in the air, they can descend without fear in the state of wearing the harness.

Also according to the invention, when the float body such as a balloon is projected into the air, and the float body lifts the aerial floating flier, which makes it possible to securely spread the aerial floating flier in the air without getting entangled.

Further according to the invention, an operation piece of valve means is associated with the harness through a short operation cord. Therefore the operation piece of the valve means is pulled by the operation cord when the case is projected into the air, so that the valve means turns into open state, and a float bag is filled with a gas with a specific gravity less than that of air in the pressure vessel, such as helium and argon, and as a consequence the float bag is inflated in the case. By this inflation, a portion perforated in sewing line form is cut off, the case is opened, and the internal folded airfoil is spread. Since the float bag is filled with a gas with a specific gravity less then that of air, it ascends in the air, and at this time the vicinity of the opening of the bag of the airfoil coupled to the float bag via the cord or directly is directed upward, and air gets into the bag through the opening, thereby inflating the bag quickly. Therefore, after seeing and recognizing that the airfoil is spread, the person wearing the harness can descend without fear from an elevated place. The float bag may be omitted.

The invention enables to promptly escape from an elevated place such as a building and an aircraft in an accident.

According to the invention, various expanded applications are provided because it can be handled easily by general people inexperienced in handling a parachute.

According to the invention, it is possible that a person to escape from a site of an accident descends slowly onto the ground by utilizing the aerial floating flier such as an airfoil and a parachute after confirming that it is spread in the air, so that the person can escape without anxiety.

BRIEF DESCRIPTION OF THE DRAWINGS

Other and further objects, features, and advantages of the invention will be more explicit from the following detailed description taken with reference to the drawings wherein:

FIGS. 3 (1)-(4) are diagrams showing the state of use of a floating and flying type escape apparatus of the invention;

FIG. 7 is a perspective view of the case 1 of a further embodiment of the invention.

DETAILED DESCRIPTION OF THE PREFERRED EMBODIMENTS

Figure 1:
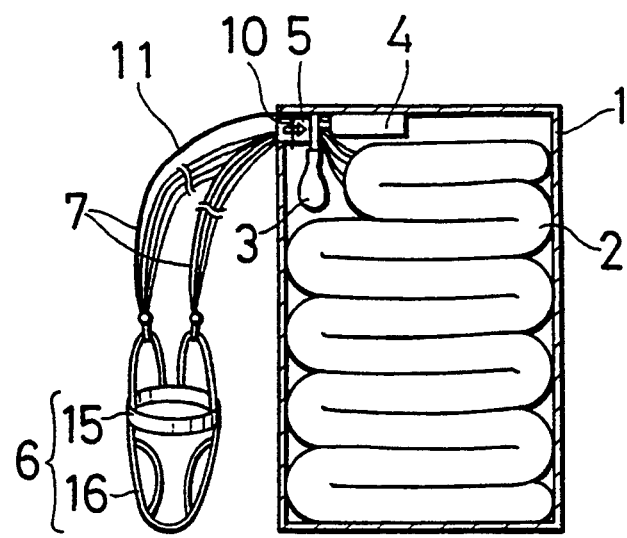
FIG. 1 is a sectional view showing a floating and flying type escape apparatus contained in an case, of an embodiment of the invention.

Now referring to the drawings, preferred embodiments of the invention are described below.

FIG. 1 is a sectional view showing a floating and flying type escape apparatus contained in an case 1 of an embodiment of the invention. In the case 1, an airfoil 2 is contained in a folded state, and a float bag 3 is also accommodated in the case 1 in a folded state, and the case 1 also incorporates a pressure vessel 4 filled with a gas with a specific gravity less than that of air, for example, helium or argon, for filling the bag 3 with the gas. Valve means 5 is interposed between the float bag 3 and the pressure vessel 4. A harness 6 to be worn on a human body is coupled to the airfoil 2 via plural elastic cords 7.

Figure 2:
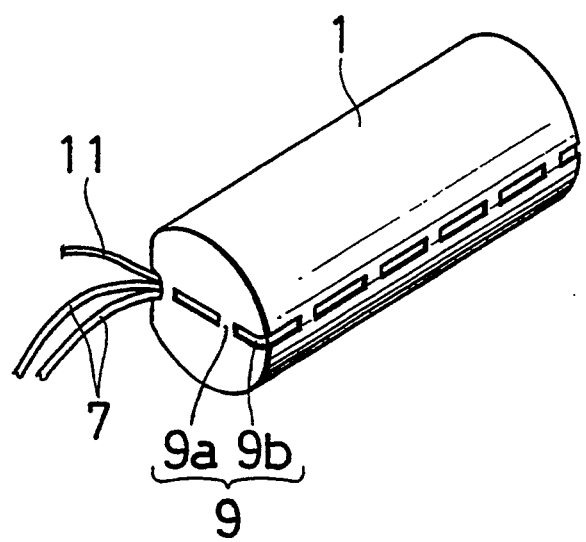
FIG. 2 is a perspective view of the case 1.

FIG. 2 is a perspective view of the case 1. This case 1 is made of a synthetic resin sheet 8 or other materials, for example, a thin film of polyethylene or nylon, and is approximately cylindrical, and a portion 9 perforated in sewing line form to be cut is formed in an endless loop within a virtual plane including the axial line of the case 1. The portion 9 perforated in sewing line form possesses a slight coupling part 9a and a slender opening part 9b.

The valve means 5 interposed between the float bag 3 and the pressure vessel 4 is provided with an operation piece 10 to be pulled for opening a valve. This operation piece 10 is coupled to the harness 6 through another cord 11 shorter than the cords 7.

FIGS. 3 (1)-(4) are perspective views showing the state of use of the invention. A further description is made with reference to the drawing. An airfoil 2 is constituted by plural slender bags 14 coupled in a lateral direction having a opening 13 in a front portion thereof and a sealed bottom in a rear potion thereof. This airfoil 2 is made of a flexible synthetic resin sheet, for example, a thin film of polyethylene or nylon. The airfoil 2 is folded and contained in the case 1 as mentioned above, and when popping out of this case 1, it is spread in the air.

A float bag 3 is folded and contained in the case 1 as described above. The float bag 3 is made of the same flexible synthetic resin sheet as above.

A harness 6 comprises a ring-shaped belt 15 surrounding a waist of a human body, and a lower belt 16 surrounding a leg portion, and the ring-shaped belt 15 is coupled to a cord 7.

A piano wire or the like having spring force is contained in the openings 13 of the bags 14 composing the airfoil 2, and it may be designed to spread the opening 13 further sufficiently by the spring force.

Referring to FIGS. 3 (1)-(4), in an event of a fire in a building or the like, a person 17 to escape first wears the harness 6 on. Then the case 1 is thrown out into the air from a building window 18. Consequently, the operation piece 10 of the valve means 5 is pulled by the operation cord 11, and the valve means 5 is put into open state in the case 1. Or, instead of throwing out, only the operation piece 10 of the case 1 may be pulled outside the window 18. Therefore, the float bag 3 is filled with the gas in the pressure vessel 4 and inflated in the case 1. As a result, as shown in FIG. 3 (1), the coupling portion 9a of sewing line 9 of the case 1 is torn and cut off, and the case is detached, the front part 12 in floating flight of the internal airfoil 2 rises together with the elevation of the float bag 3, and the opening 13 is opened upwards, so that the air easily gets into the airfoil 2 as shown in FIG. 3 (2). The person 17 recognizes that the airfoil 2 is spread sufficiently as being pulled by the cord 7 as shown in FIG. 3 (3), and escapes out of the window 18. Thus, as shown in FIG. 3 (4), it is possible to float and fly in the air safely by the airfoil 2, and descend slowly on the ground. By using such float bag 3, it is possible to descend slowly on the ground safely, even from a relatively low place, such as second or third floor of a building.

Figure 4:
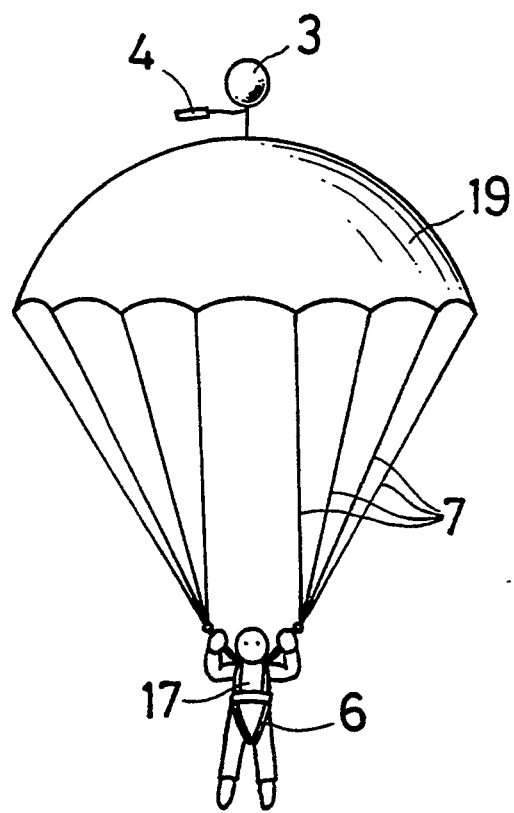
FIG. 4 is a perspective view of an escape apparatus by floating and flying of other embodiment of the invention.

FIG. 4 is a diagram showing a floating flight state in other embodiment of the invention. This embodiment is similar to the foregoing embodiment, and corresponding parts are identified with the same reference numerals. What is of note in this embodiment is that a parachute 19 is attached to the float bag 3. In other embodiments of the invention, aerial floating fliers having other constitutions may be also used.

Figure 5:
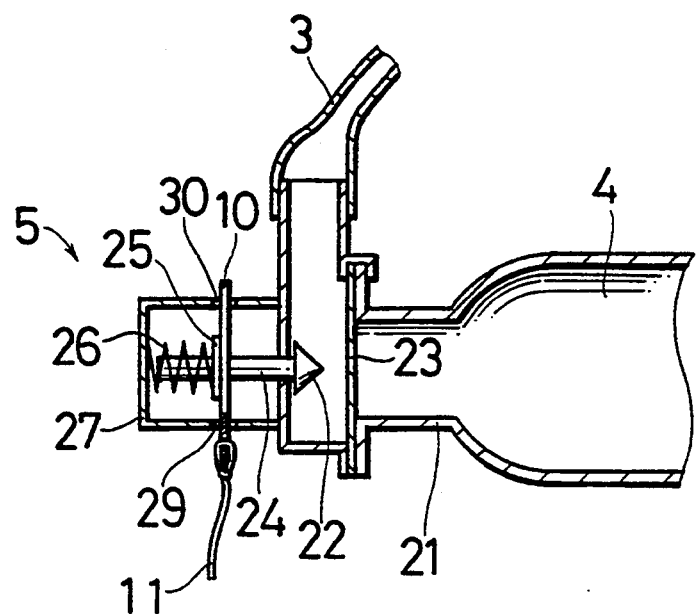
FIG. 5 is a sectional view of a vicinity of valve means 5.

FIG. 5 is a sectional view of the vicinity of valve means 5. An opening 21 of the pressure vessel 4 is enclosed with a sealing plate 23 such as an aluminum or other metals thin plate that can be broken by a pointed blade 22, such as a conical blade. An outward flange 25 is fixed to a shaft part 24 of the blade 22, and a spring 26 is interposed between the flange 25 and a housing 27. The spring 26 supplies the blade 22 with a spring force toward the sealing plate 23. An operation piece 10 encloses the shaft part 24 between the flange 25 and the blade 22 with a notch portion 37 as shown in FIG. 6, and this operation piece 10 is stopped in stopping portions 29, 30 of the housing 27.

Figure 6:
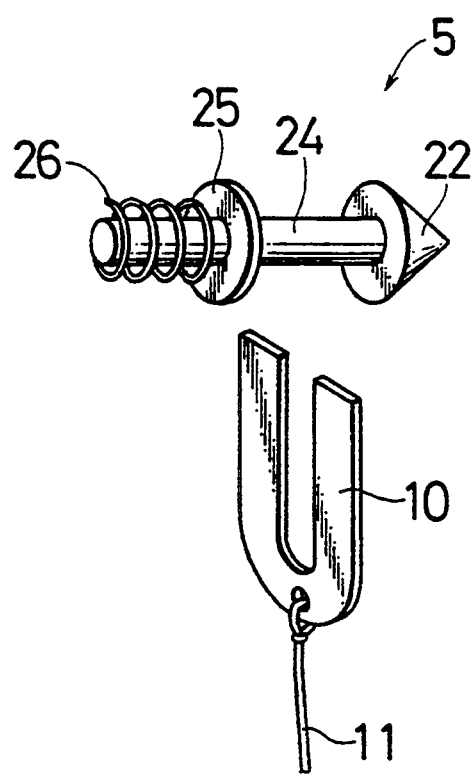
FIG. 6 is a perspective view showing a partial constitution of the vicinity of the valve means 5.

When escaping in an accident, as the operation piece 10 is pulled to a downward direction of FIG. 5 and FIG. 6 by an operation cord 11, the operation piece 10 is separated from the flange 25, so that the blade 22 breaks the sealing plate 23 by virtue of the spring force of the spring 26. Therefore, the gas in the pressure vessel 4 is supplied to fill the float bag 3 through the valve means 5.

FIG. 7 is a perspective view of the case 1 of a further embodiment of the invention. In the embodiment, the case 1 is shaped like a projectile with a tapered end 73 so that a person to escape can easily throw out it toward the sky. This embodiment is similar to that shown in FIG. 2 and corresponding parts are identified with the same numerals.

In the above-described embodiments, the case 1 is thrown out into the air by the person 17, but in other embodiments of the invention, the bag 1 may be thrown out into the air, for example, by pistol-like projecting means. Or, instead of throwing out the case 1 into the air, elements 2 to 5 contained in the case 1 may be taken out, and then thrown out into the air. Instead of the case 1, using a cord such as a rope that can be easily cut off when inflating the float bag 3 or adhesive or other means with a small adhesive strength, the airfoil 2 may be maintained to be folded as shown in FIG. 1.

As the aerial floating flier, for example, a hang glider, a parachute glider, or the like may be also used.

The invention may be utilized not only when descending from a building or an aircraft, but also when descending from a collapsing bridge or a train falling down from a bridge, and the invention can be widely applied for saving lives in the event of various disasters.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An aerial floating and flying escape apparatus for allowing a person to slowly and safely descend even from a relatively low altitude, comprising:
   - a case having an exterior surface with a perforated portion formed thereabout;
   - an aerial floating flyer contained in said case;
   - a harness to be worn on a human body;
   - a plurality of cords each having one end connected to said harness and the other end connected to said aerial floating flyer;
   - a float bag contained in said case and being interconnected with said aerial floating flyer;
   - a pressure vessel contained in said case filled with a gas having a specific gravity less than that of air;
   - valve means interposed between said float bag and said pressure vessel;
   - actuator means, operably connected to said valve means, for opening said valve means to enable introduction of said gas into said float bag to expand said case and cause the perforations to break allowing said float bag and said aerial floating flyer to be released from said case and further allowing said float bag to float said aerial floating flyer to insure that it is sufficiently spread in the air.

2. The aerial floating and flying escape apparatus of claim 1 in which said aerial floating flyer is an airfoil.

3. The aerial floating and flying escape apparatus of claim 1 in which said aerial floating flyer is a parachute.

4. An aerial floating and flying escape apparatus for allowing a person to slowly and safely descend even from a relatively low altitude, comprising:
   - a case having an exterior surface with a perforated portion circumferentially formed thereabout;
   - an airfoil being folded and contained in said case, said airfoil including a plurality of laterally coupled bags, each said bag having an open end and a closed end to allow easy entry of air into said bags when said airfoil is in the unfolded, open position to facilitate proper spreading of the airfoil;
   - a harness to be worn on a human body;
   - a plurality of flexible cords having one end connected to said harness and the other end connected to said airfoil;
   - an airtight float bag being folded and contained in said case; said float bag being interconnected with said airfoil and located above said airfoil in the unfolded open position;
   - a pressure vessel contained in said case filled with a gas having a specific gravity less than that of air;
   - valve means, including a removable valve operation piece, interposed between said float bag and said pressure vessel;
   - an operation cord connected to said valve operation piece; said valve operation piece being removed from said valve means upon actuation of said operation cord thereby enabling introduction of said gas into said float bag to expand said case and cause the perforation to break allowing said float bag and said airfoil to be released from the case and further allowing said float bag to float said airfoil to insure that the airfoil is sufficiently spread in the air.

5. An aerial floating and flying escape apparatus for allowing a person to slowly and safely descend even from a relatively low altitude, comprising:
   - a case having an outer surface being made of a synthetic resin sheet, including a perforated portion circumferentially formed in an endless loop about said outer surface;
   - an airfoil being folded and contained in said case including a plurality of laterally coupled bags formed of a flexible synthetic resin sheet, each said bag having an open end and a closed end to allow easy entry of air into said bags when said airfoil is in the unfolded position to facilitate proper spreading of the airfoil in the air;
   - a harness to be worn on a human body;
   - a plurality of flexible cords having one end connected to said harness and the other end connected to said airfoil;
   - an airtight float bag formed of a flexible synthetic resin sheet being folded and contained in said case and interconnected with and located above said airfoil in the unfolded position;
   - a gas filled pressure vessel contained in said case for feeding gas with a specific gravity less than that of air into said float bag;
   - valve means, including a removable valve operation piece, interposed between said float bag and said pressure vessel;
   - an operation cord, shorter than said plurality of flexible cords, coupled to said valve operation piece; said valve operation piece being removed from said valve means upon actuation of said operation cord thereby enabling introduction of said gas into said float bag to expand said case and cause the perforation in said case to break allowing said float bag and said airfoil to be released from the case and further allowing said float bag to float said airfoil to insure that the airfoil is sufficiently spread in the air.

* * * * *